Aug. 11, 1959　　J. F. CROSFIELD ET AL　　2,899,143
REGISTER CONTROL OF MOVING WEBS
Filed March 12, 1956　　7 Sheets-Sheet 1

FIG.I.

Inventors
John F. Crosfield
Daniel Gold
By Ralph B. Stewart
Attorney

Aug. 11, 1959     J. F. CROSFIELD ET AL     2,899,143
REGISTER CONTROL OF MOVING WEBS
Filed March 12, 1956     7 Sheets-Sheet 2

Inventors
John F. Crosfield
Daniel Gold
By Ralph B. Stewart
Attorney

FIG. 3.

United States Patent Office 2,899,143
Patented Aug. 11, 1959

2,899,143

REGISTER CONTROL OF MOVING WEBS

John F. Crosfield and Daniel Gold, London, England, assignors to J. F. Crosfield Limited, London, England, a British company Application March 12, 1956, Serial No. 570,878

Claims priority, application Great Britain March 16, 1955

18 Claims. (Cl. 242—58.3)

In the printing of a continuous web of paper using a rotary printing press, the paper is fed into the press from a reel and as soon as one reel is exhausted, the end of the web on a new reel must be pasted to the end of the web of the old reel so as to maintain continuity of operation in the press. Most simply this pasting operation is carried out manually and for this purpose it is, of course, necessary to stop the press. If, however, it is desired to keep the press operating continuously, the pasting may be effected automatically by means of apparatus known as a "flying paster."

In one form of such apparatus, the reel of paper is mounted in a stand which has provision for the mounting of two reels spaced at 180 degrees apart, or of three reels spaced at 120 degrees apart. In the normal operative position, the reel of paper is driven by means of a belt drive acting on its periphery and the web is led off the reel by means of draw rollers. As the end of the reel approaches, the reelstand is turned in its bearings by either 180 degrees or 120 degrees so as to bring a new reel into the operative position where it is driven by the belt drive. Paper continues to be drawn off the old reel, however, which is no longer driven. At this stage of affairs, therefore, paper is being drawn off the old reel which is nearly exhausted, past the periphery of the new reel which is driven so that its periphery moves at substantially the same speed as the paper leaving the old reel.

The leading edge of the paper on the new reel is provided with a coating of adhesive material over a short length and in order to stick the two together it is therefore only necessary to press the surface of the old web against the end of the new web, which is then torn away and feeds off the new reel. For this purpose a pivotally mounted brush is caused to rock under the control of a solenoid so as to press the old web against the end of the new web. It is usual for this operation to be controlled by means of a simple photo-electric device, so that the brush presses the old web on to the new reel shortly before the instant when the adhesive portion of the new reel reaches the position of "pasting." This ensures that the joint takes place over the whole of the adhesive area rather than over only a fraction of it, which would lead to a weak joint liable to tear.

The description so far has assumed that the webs to be stuck together are unprinted, but in some cases, particularly in multi-colour printing processes, the webs may be preprinted. They may, for example, have been printed in one or more colours and are required to be passed to the press again for the printing of the remainder of the necessary colours. The preprinting of the webs raises an additional problem in that the new reel must be joined to the old web with the printing on the two webs in good register. If a "flying paste" were to be made out of register, considerable quantities of paper would be wasted before the register controlling mechanism of the press itself served to bring the web back into register again.

According to the invention the new reel is wound so that its periphery is approximately equal to an integral number of preprinted units and two sets of electrical impulses are generated corresponding to the passage of integral numbers of preprinted units on the web and the reel respectively, the interval between impulses corresponding to the web and the reel being representative of the error in registration, and the speed of the reel is controlled in accordance with the said interval to produce a relative displacement of the preprinted units on the web and the reel to reduce the said error, mechanism being brought into action to stick the web to the reel when the error reaches a predetermined small value.

The impulses may be produced by two photo-electric scanning heads which scan printed marks on the web and on the reel respectively.

The speed of the new reel may be modified by means of a correction motor, the speed of which is adjusted in accordance with the register error during the period immediately before the sticking of the old web to the new reel. Rotation of this motor then steps the new reel on in relation to the old web until the error is reduced to a value at which "pasting" can be carried out with the preprinted units substantially in register.

The drive to the new reel preferably includes a differential or epicyclic gearbox, one member of which is controlled by the correction motor.

It is desirable for the correction of the register error to take effect as soon as possible after the new reel has been brought into position. According to a feature of the invention, the apparatus includes pulse-generating means for generating a pulse the length of which represents the interval between signals from the photo-electric scanning heads, and a switching device adapted to apply a signal, the amplitude of which varies in accordance with the length of the said pulse, to a circuit for operating the correction motor, the switching device being operated after each of the said pulses. Thus when the register error correction system is brought into action, as soon as the first marks pass the light-sensitive devices, a pulse representing the register error is generated and a corresponding correction signal is applied to the motor. The expression "length of the pulse" is used in this specification to mean the duration of the pulse.

It is important that the tension of the web being fed to the press shall be maintained substantially constant, particularly at the instant of "pasting," since excessive tension is liable to tear the pasted joint. When the reelstand has no automatic tension control of its own, the above-mentioned electric motor may conveniently be used during normal operation of the apparatus, that is to say at times other than just prior to sticking an old web to the new reel, to maintain the tension in the web which is being fed from the reel at a substantially constant value. The speed of the electric motor may be controlled by the position of a tension roller in such a way as to maintain the tension substantially constant. In general during tension control the motor will be running continuously. When a new reel is being brought into use, the system must be changed from tension control to register error control. At such times, it would be impossible to control tension effectively by means of the belt, because the drive is being transferred from the old reel to the new reel, and it is sufficient to employ a form of friction brake to act upon the old reel during the remainder of its rotation. Moreover the gearbox controlling the drive to the new reel is required to respond to the register error and the correction of the error might well be nullified if tension variations were also taken into account. When "pasting" is complete, it is important to provide a smooth change-over from control exerted by register errors to control exerted in response to variations in tension, to avoid a sharp pull on the joint. This is achieved in accordance with a feature of the present invention by arranging that when the register error has been reduced to a value such that the old web can be stuck to the new reel, the speed and direction of the correction motor are the same as they were when the latter was operating as a tension control, immediately prior to its operation as a register control. As the variation in tension during the period of register control is unlikely to have been very large, there will be little change in the speed of the correction motor when the system is changed back to tension control.

In order that the invention may be better understood an example thereof will now be described with reference to the accompanying drawings, in which.

Figure 1:
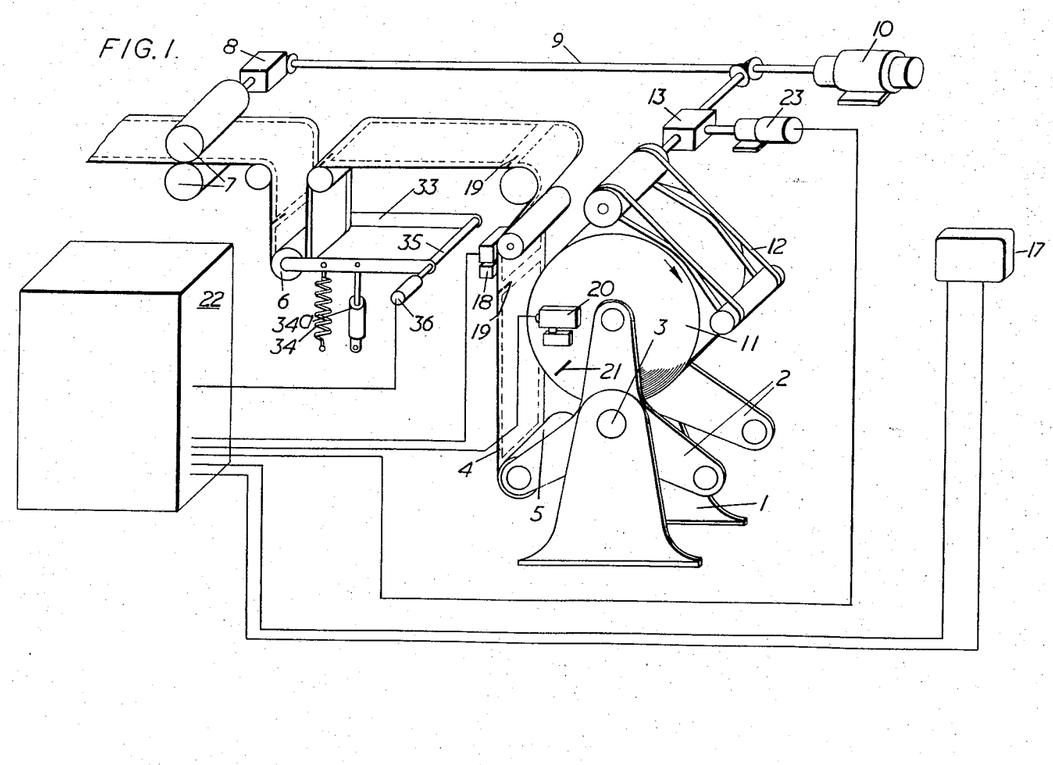
Figure 1 is a perspective view of the reelstand, the driving motors and the rollers determining the path of the web.

In Figure 1, the reelstand 1 is provided with three pairs of arms 2 mounted on a common rotatable spindle 3 and angularly spaced from one another at 120°, each pair of arms being adapted to hold a reel of paper. With the apparatus in the condition shown in the drawing, a web of paper 4 on which a repetitive design has been printed is being fed from a reel 5 by way of a tension roller 6 to a pair of draw rollers 7, whence it passes, for example, to a folding machine or a machine for superimposing a further colour impression on the existing printed design. The draw rollers 7 are driven through a gearbox 8 and a shaft 9 by a motor 10.

Figure 2:
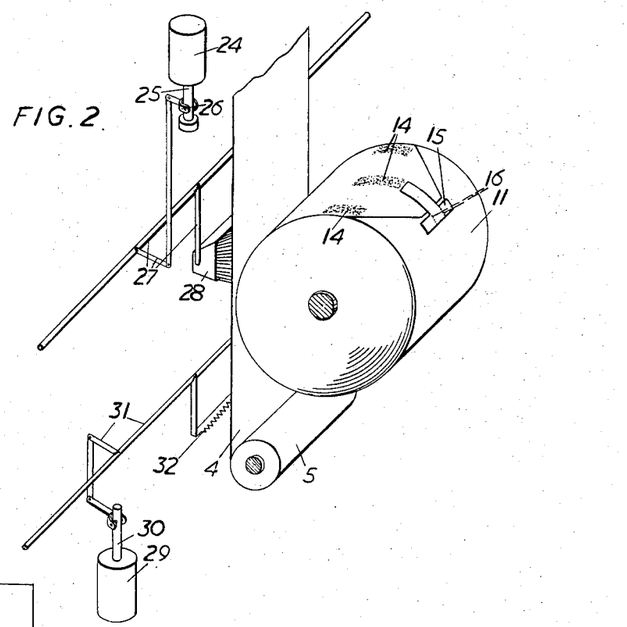
Figure 2 is a perspective view of the pasting brush, a knife for cutting the old web after pasting, and their operating mechanisms.

In the condition shown in the drawing, the reel 5 is nearly exhausted and the arms of the reelstand have just been rotated through 120° to move the reel 5 down to the position shown and to bring a fresh reel 11 of paper, printed with the same repetitive design, into the uppermost position, which is the position from which the web of paper is normally supplied. The new reel 11 is being driven by a belt 12 which is connected to the motor 10 through differential gearing 13. As shown in Figure 2, the outer surface of the end of the new reel is coated in strips 14 with an adhesive material such that when the paper of the old reel is pressed against the end of the new reel the two stick together instantaneously. The end of the new reel is initially attached to the underlying turn of the paper on the new reel by means of a piece of adhesive paper 15 which is provided with two lines of perforations 16 so that when the old web sticks to the paper on the new reel the pull on the latter will break the adhesive paper along the perforated lines and the new reel will commence to unwind.

When the new reel has been moved to the uppermost position, controls on a panel 17 are operated to bring into operation on the one hand apparatus for correcting any error in register between the preprinted units on the old web and the new reel, and on the other hand, apparatus for sticking the old web to the new reel when the error is sufficiently low.

A photo-electric cell 18 which co-operates with the correction apparatus is arranged to scan the margin of the moving web 4 and produces pulses in response to the passage of marks 19 in the margin, which is otherwise clear. A further photo-electric cell 20 is mounted at the side of the new reel 11 which is provided with a single mark 21, a single pulse being produced by the photo-electric cell 20 for each revolution of the reel 11. The positions of the photo-electric cells are so chosen that if the web 4 is pasted to the reel 11 when the pulses from the two cells coincide, the preprinted units on the web and the reel will be in register.

The new reel 11 is wound to such a diameter that its circumference is approximately equal to an integral number of preprinted units so that once the circumferential speed of the reel 11 is equal to the speed of the web 4 and the preprinted units have been brought into register, they will remain in register. In the following description it will be assumed that the circumference of the reel 11 is equal to two preprinted units. Thus each of the pulses produced by the photo-electric cell 20 represents the passage of two preprinted units.

The signals from the photo-electric cells are fed to a control unit 22 which generates a signal representing the interval between the pulses from the photo-electric cells, that is to say the error in registration between the preprinted units on the old web and on the reel. The register error is always considered as being the distance between a mark scanned by the photo-electric cell 20 and the next mark scanned by the photo-electric cell 18, because the latter cell scans twice as many marks as the former. The maximum possible register error is therefore just under one half of the reel circumference. This signal is fed to a correction motor 23 which is connected to a further input shaft of the differential gear 13. The belt 12 is driven by the output shaft of the differential gear in accordance with the sum or difference of the speeds of the motors 10 and 23, the motor 23 contributing only a small proportion of the total speed.

Thus, when there is a substantial error in registration, the speed of the motor 23 is adjusted to vary the speed of the new reel 11 in such a manner that the register error will be reduced. When the error is reduced to a predetermined small value, the control unit 22 energises a brush coil 24 (Figure 2), as a result of which a plunger 25 raises a fork 26 fixed to a linkage 27 and a brush 28 attached to the linkage 27 is moved forward to bring the old web 4 into contact with the new reel 11.

On the next occasion that the coated strips 14 on the end of the new reel pass under the brush 28, the web 4 is stuck to the surface of the new reel. The movement of the web 4 tears the end of the new reel away from the underlying layer and for a short period the two paper webs are fed through the machine together. After a suitable delay the control unit 22 energises a knife coil 29 (Figure 2) and an associated plunger 30 operates a linkage 31 to move forward a knife 32 so that it cuts the old web, after which only the paper from the new reel is fed through the machine.

During normal running of the apparatus, when the web is being drawn from the uppermost reel, the belt 12 has a slight braking effect. This enables the tension of the web to be controlled at such times by means of the motor 23, and also tends to prevent the reel from overrunning if the machine stops suddenly.

The tension roller 6 is fixed to levers 33 which are pulled downwardly by a spring 34, an oil dashpot 34a being provided to damp the movement of the levers. The levers 33 are fixed to a shaft 35 on the pivotal axis of the levers, and an extension of the shaft 35 carries a resolver 36 which provides an alternating voltage, the amplitude of which represents the angular position of the levers. The resolver is so arranged that it would give zero output if the tension of the web around the roller 6 were correct, so that at other times it provides an output signal which represents the amplitude of the error in the tension. This signal is fed to the control unit 22 and, at times other than when a new reel is about to be pasted to the old web, it is used to control the speed of the motor 23 in order to maintain the tension in the web 4 at a selected value. In general, when the system is working as a tension control it will be necessary for the motor 23 to run continuously to maintain the tension constant. Furthermore, it is arranged that when the system is working as a tension control, the direction of rotation of the motor 23 is always the same, namely the direction in which the motor 23 contributes positively to the speed of the reel. When the system changes over to a register control, if the motor 23 continued to run at the same velocity as with the tension control, the new reel would be running at the same speed as the draw rollers and no correction would be effected. The system is arranged so that to achieve maximum correction rate the motor 23 must be rotated at a maximum speed in the reverse direction.

The error is reduced by this maximum correction rate until the error becomes less than a critical value, after which the correction rate is reduced, becoming proportional to error.

The reduction of correction rate is achieved by reducing the reverse speed of the motor. As the error becomes progressively smaller the motor speed reduces, goes through zero and then increases in the original direction.

As the error approaches zero the motor speed approaches its original value as a tension control. When the error becomes very small and the pasting mechanism is brought into operation, the system changes over to tension control without a pull on the web, which would put a strain on the newly-formed joint.

When the arms of the reelstand have been rotated to bring a new reel into the uppermost position, a friction brake (not shown) acts on the axle of the old reel to maintain the web 4 in a state of tension. A friction brake would not be suitable for maintaining tension throughout the unwinding of a reel, since the web tension acts at a steadily decreasing radius, but it can be used for the remainder of the rotation of the old reel, since the radius of the latter does not change very much during the period for which the friction brake is acting.

Figure 3:
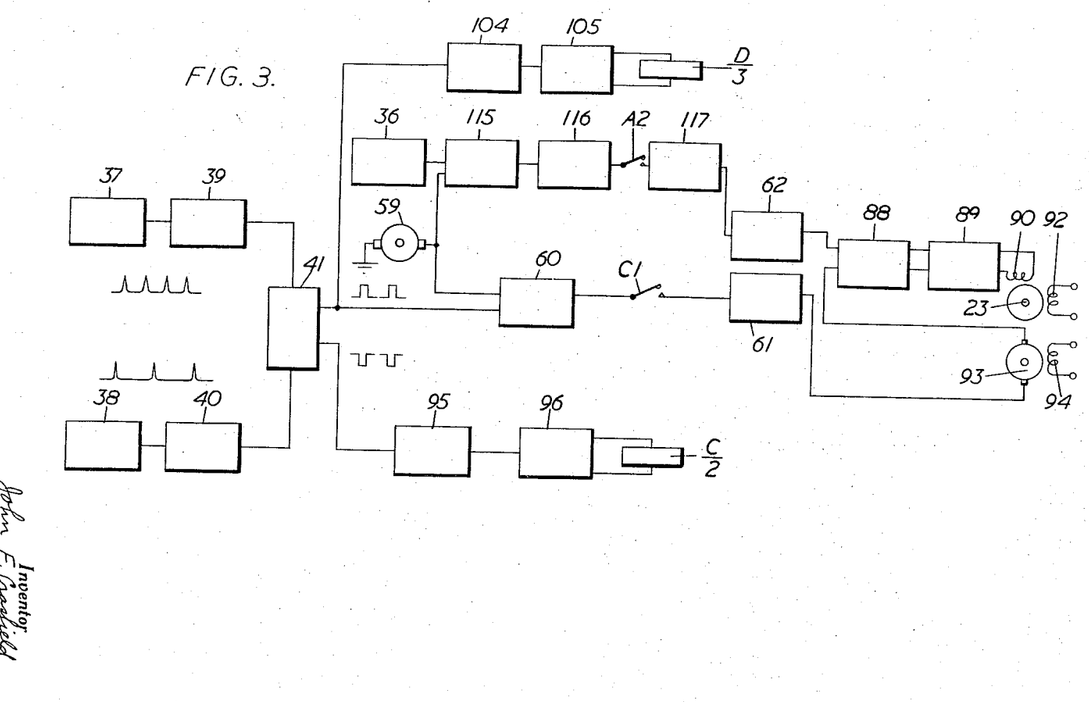
Figure 3 is a block diagram of apparatus for reducing the error in registration and for controlling the timing of the pasting and cutting operations.

The electronic apparatus which is used to control the speed of the motor 23 and to control the timing of the operation of the pasting and cutting mechanisms is shown in a block diagram in Figure 3.

The photo-electric cells 18 and 20 form part of two similar scanning heads 37 and 38 (Figure 3), the signals from which are applied through similar amplifiers 39 and 40 respectively to opposite grids of a trigger circuit 41. It will be remembered that the photo-electric cell 18 produces a pulse representing the passage of each preprinted unit of the old web and the photo-electric cell 20 generates a pulse after every second preprinted unit. The output of the amplifier 39 will therefore include twice as many pulses as that of the amplifier 40. The trigger circuit is arranged to generate a square pulse, the length of which is equal to the time interval between a pulse from the amplifier 40 and the next pulse from the amplifier 39. The length of the square pulse will thus represent the register error between the preprinted units on the old web and the new reel respectively.

Figure 4:
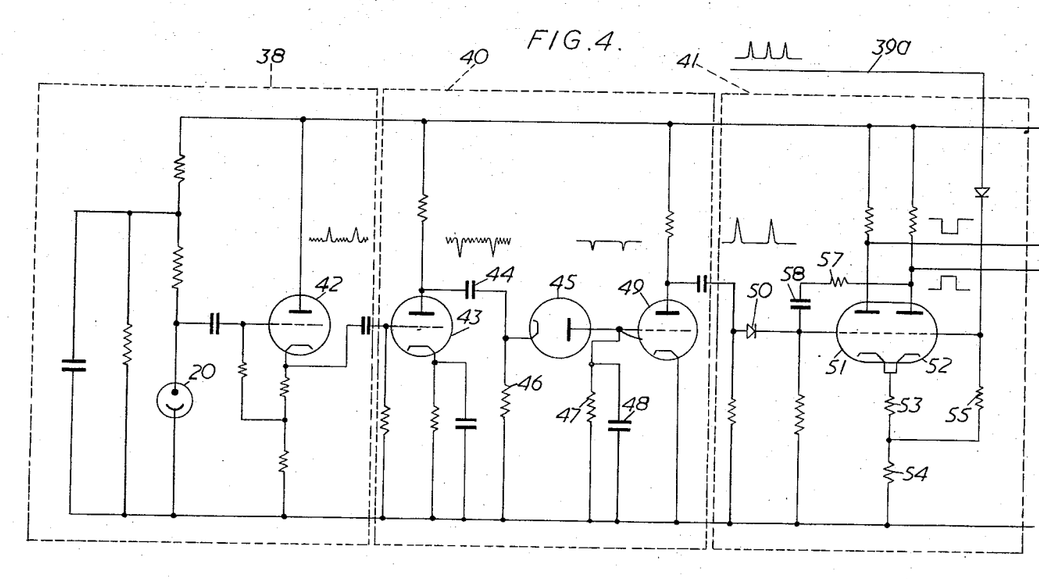
Figure 4 is a circuit diagram of pulse-generating apparatus forming part of Figure 3.

The circuits 38, 40 and 41 are shown in greater detail in Figure 4. In the scanning head 38, the photoelectric cell 20 is connected in the grid circuit of a triode 42 which is connected as a cathode follower. The signal at the cathode of the triode 42 includes the pulses produced by the photo-electric cell 20 in response to the passage of the mark 21 on the side of the reel 11, together with electrical "noise" due to any other undesirable markings on the side of the reel. This signal is passed to the amplifying stage 40, which includes two amplifying triodes separated by a chopper. The output of the first triode 43 is applied through a capacitor 44 to the cathode of a diode 45 which is arranged as a chopper. The cathode of the diode is connected to earth through a resistor 46 of very high value (of the order of 100 megohms) and the anode of the diode is connected to earth by a resistor 47 of much smaller value in parallel with a capacitor 48. Owing to the presence of the diode and the large time constant of the path consisting of the capacitor 44 and the resistor 46, the capacitor 44 is charged positively and biases the cathode of the diode. For this reason, the diode will not respond to small signals, but when a large negative pulse is applied to its cathode, only the negative peak of the pulse will be transmitted through the diode to the grid of a triode amplifier 49. Thus the signal which is amplified by the triode 49 is free from "noise."

The amplified pulses at the anode of the triode 49 are applied through a rectifier 50 to the grid of a triode 51, which with a triode 52 forms the trigger circuit 41. The triodes 51 and 52 have a common cathode circuit comprising two resistors 53 and 54 connected in series, the grid of the triode 52 being connected to the junction of the resistors 53 and 54 through a resistor 55, and the anode of the triode 52 being connected to the grid of the triode 51 through a resistor 57 in series with a capacitor 58. The triode 52 is normally conducting but the arrival of a large positive pulse at the grid of the triode 51 causes current to be passed by the latter. Thus a greater current flows through the common cathode circuit and the bias on the triode 52 is increased. The resultant fall in the current passing through the triode 52 causes an increase in its anode potential which is reflected at the grid of the triode 51 and which reinforces the positive initiating pulse. This action is cumulative and after a very short interval triode 51 is conducting heavily and triode 52 is cut off. The arrival of a positive pulse from the amplifier 39 (Figure 3) at the grid of the triode 52, by way of conductor 39a, will reset the trigger circuit, and thus there will be produced at the anodes of the valves 51 and 52 square pulses the lengths of which correspond to the interval between the positive pulses which are applied to their grids. The trigger circuit is basically monostable, however, and if the arrival of a positive pulse at the grid of triode 52 is delayed too long (that is to say if the register error is too great) the trigger circuit will reset itself. Thus the length of the error pulses is proportional to the interval between corresponding pulses from the scanning heads up to a certain value, but for intervals greater than this the error pulse generated by the trigger circuit has a constant maximum length. Unless otherwise stated, it will be assumed in the following description that the error in registration is of a value smaller than that for which the error pulse has its maximum value, so that the error pulses produced by the trigger circuit are proportional to the error in registration.

Before the arrival of a further positive pulse at the grid of triode 51, a second pulse will reach the grid of triode 52. This pulse will have no effect since the trigger circuit has already been reset and triode 52 is conducting.

The square pulses at the anodes of the triodes in the trigger circuit 41 represent "error time" and not "error length," that is to say, they represent the time interval between the passage of the corresponding marks past the two scanning heads and not the length of the error in registration between preprinted units on the web and the reel. This time interval is of course equal to the error in registration, expressed in terms of length, divided by the speed of the press. To obtain "error length" from "error time," it is therefore necessary to multiply the latter by the press speed. Furthermore, since each "error time" pulse, after modification, is used to generate a motor input signal which causes the motor 23 to run at a corresponding speed until the next pulse is received, the amount of error correction achieved by the motor 23 before the arrival of the next pulse is inversely proportional to the frequency of the pulses, that is to say, to the press speed. The correction signal to be applied to the motor should therefore be the product of the error length and the press speed, or the product of "error time" and the square of the press speed.

Referring again to Figure 3, the "error time" pulses from the trigger circuit 41 are applied, together with a signal which represents press speed and which is derived from a D.-C. tacho-generator 59, driven by the press, to a squaring and integrating circuit 60, by means of which there is obtained a voltage representing the product of the "error time" and the square of the press speed. Once per revolution of the new reel, a contact C1 closes for a short period and the output of the integrating circuit is applied to a storage capacitor in the input circuit of a cathode follower stage 61, the difference between the potentials at the cathodes of triodes in the cathode follower stage 61 and a further cathode follower stage 62, which may be assumed for the present to have a constant cathode potential, being used to control the speed of the motor 23 (Figure 1) in a manner to be described.

Figure 5:
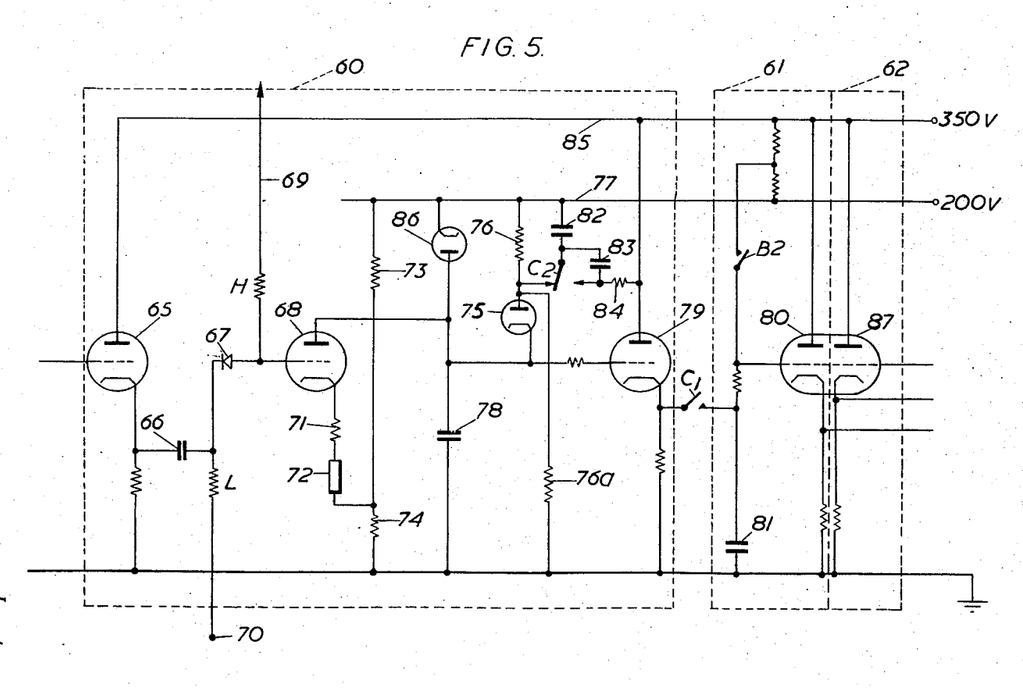
Figure 5 is a circuit diagram of another part of the apparatus shown in Figure 3.

The circuits 60—62 will now be described in greater detail with reference to Figure 5. The positive square pulses from the anode of triode 52 (Figure 4) are applied to the grid of a triode 65 (Figure 5) which is connected as a cathode follower. The output signal from the triode 65, which consists of positive square pulses of length corresponding to the "error time," is applied through a capacitor 66 and a rectifier 67 to the grid of a charging triode 68. This grid also receives by way of a conductor 69 a D.C. signal (representing the press speed) generated by the tacho-generator 59 (Figure 3), and is connected to a terminal 70 to which a small negative bias is applied. In the absence of a signal from the triode 65, the rectifier 67 conducts and triode 68 remains unaffected by the press speed signal on conductor 69. When a positive "error time" pulse appears at the cathode of triode 65, the rectifier 67 blocks, allowing the press speed potential to control the triode 68 for the duration of the pulse. The cathode circuit of the triode 68 includes a resistor 71 of 33,000 ohms and a Metrosil 72, the latter being a non-linear element manufactured by Metropolitan Vickers Electrical Company. The lower end of the Metrosil 72 is connected to the junction of a resistor 73 of 33,000 ohms and a resistor 74 of 1000 ohms. The value of the resistor 71 is so chosen that in conjunction with the Metrosil 72 it forms a squaring circuit, so that the current passing through the charge triode 68 during an "error time" pulse is approximately proportional to the square of the press speed.

The anode of the triode 68 is connected through a diode 75 in series with a resistor 76 to a conductor 77 to which there is applied a positive potential of 200 volts. The resistor 76 and an equal resistor 76a form a potentiometer across the 200 volt supply. In the absence of a positive "error time" pulse the triode 68 will be non-conducting and its anode will have a positive potential substantially equal to that of the conductor 77, as will be explained.

The cathode of the diode 75 is thus at a higher potential than the anode of the diode, which is connected to the junction of the equal resistors 76 and 76a and therefore has a potential of 100 volts. The diode 75 is therefore non-conducting. When the positive "error time" pulse arrives at the grid of the triode 68, this triode draws current from an integrating capacitor 78, which is thus charged linearly. If the "error time" pulse is long enough, the capacitor 78 will charge until the potential at the cathode of diode 75 is equal to the anode potential of this diode (100 volts). The capacitor 78 has now reached its lower reference potential and cannot be charged further. The diode 75 conducts for the remainder of the pulse and the charge on capacitor 78 remains the same.

The voltage across the capacitor 78 is applied to the grid of a triode 79, connected as a cathode follower, and the signal at the cathode of the latter is applied, through the contact C1 when the latter is closed, to the grid of a further triode 80 in the cathode follower stage 62. The contact C1, which is associated with a relay C (see C/2 in Figure 6), the operating circuit for which will be described later, closes shortly after the termination of an "error time" pulse and re-opens after a fixed interval of time. The triode 80 includes in its input circuit a storage capacitor 81 of 0.25 microfarads by means of which the signal at the grid of the triode 80 is maintained at a substantially constant value until contact C1 closes again.

When contact C1 closes, contact C2 changes over and the junction of two capacitors 82 and 83, of 0.25 and 0.02 microfarads respectively, is connected through a resistor 84 to a conductor 85 to which there is applied a positive potential of 350 volts. The other side of the capacitor 82 is connected to the 200 volt conductor 77. When, after a fixed time interval, contact C1 opens and contact C2 falls back to its original position, the junction of capacitors 82 and 83 is reconnected through C2 to the anode of the diode 75, the signal stored by the capacitor 78 is rapidly discharged through the diode and the potential of the anode of the triode 68 is restored to 200 volts. This is the upper reference voltage for the capacitor 78. The anode of the triode 68 is prevented from becoming more positive than 200 volts by a diode 86, the anode of which is connected to the anode of the triode 68 and the cathode of which is connected to the 200 volt conductor 77. Capacitor 82 continues to discharge through the resistor 76a until the potential of the junction of the resistors 76 and 76a is again 100 volts, the diode 75 becoming non-conducting as soon as the potential of this junction drops below 200 volts. The integrating capacitor 78 is now ready to receive the next error correction signal.

If the "error time" pulse from the triode 65 is short, so that it ends before the capacitor 78 has had time to charge to its lower reference potential, the value of the charge at the end of the pulse will be proportional to the length of the "error time" pulse (for a given press speed), and the voltage which is applied to the grid of the triode 80 will be proportional to the length of the "error time" pulse. If the press speed changes, the amplitude of the current drawn by the triode 68 from the capacitor 78 changes in accordance with the square of the press speed, and the charge of capacitor 78 at the end of the "error time" pulse is also proportional to the square of the press speed (provided that the end of the "error time" pulse occurs before the capacitor 78 is charged to its lower reference potential). Thus when the "error time" pulse is short, the signal which is applied to the grid of the triode 80 represents the product of the "error time" and the square of the press speed.

The triode 80 acts in conjunction with a further triode 87 in the cathode follower stage 62, the potential difference between the cathodes of the two triodes being used to control the speed of the motor 23. During register error correction, the potential at the cathode of the triode 87 may be considered as constant, so that the motor 23 is controlled by the potential variations at the cathode of triode 80.

Referring again to Figure 3, the output conductors from the cathode follower stages 61 and 62 are connected to a modulator 88 of conventional design, the output of which, during register error correction, is an alternating voltage which varies in accordance with variation of the product of the error in registration (expressed in terms of length) and the press speed. The modulator output is passed through an amplifier stage 89, also of conventional design, and is then applied to a first winding 90 of the two-phase motor 23 (see also Figure 1), the other winding 92 of which is connected to a source of alternating potential of constant amplitude and quadrature phase. The motor 23 drives a D.C. tacho-generator 93, the winding 94 of which is connected to a source of D.C. potential of constant amplitude. The output of the tacho-generator 93 is applied in series with the output of the cathode follower 61 to the modulator, in such a manner that a rate signal of opposite polarity to the output of the cathode follower stages 61 and 62 is fed back to the input circuit of the modulator. As a consequence, the speed of the motor 23 is proportional to the amplitude of the potential difference between the output conductors from the cathode follower stages 61 and 62.

Thus after every revolution of the new reel there is applied to the storage capacitor 81 a signal representing the product of the error length and the press speed, and the speed of the motor 23 is adjusted accordingly. As a result, the speed of the rotating reel is modified in such a manner that the register error is reduced.

Figures 6, 7:
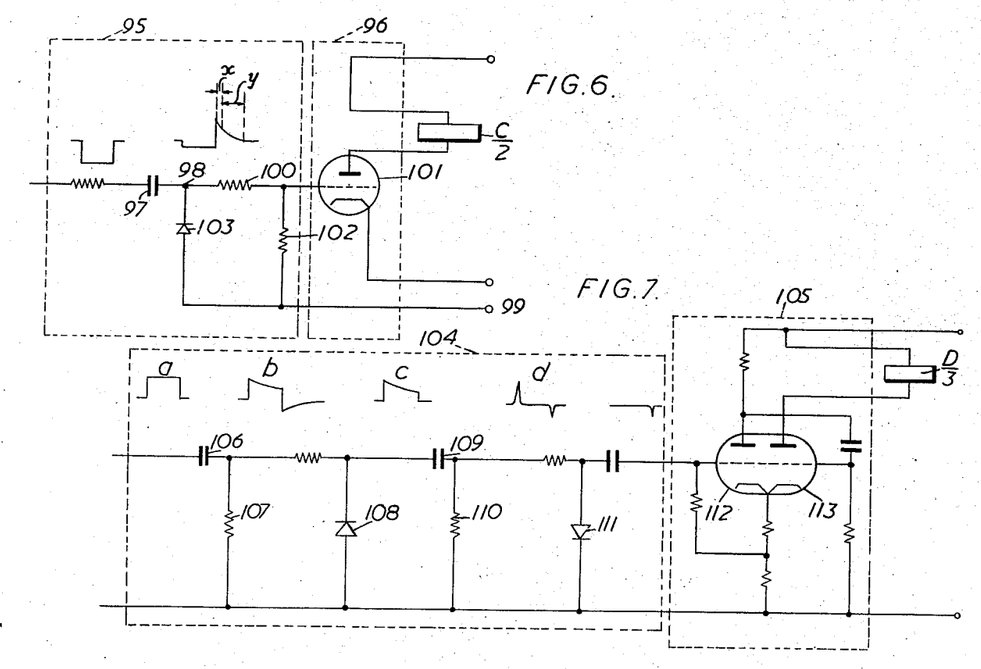
Figure 6 is a circuit for operating a relay at a given moment during each rotation of the new reel.
Figure 7 is a circuit diagram of apparatus for operating the pasting relay.

It will be seen from Figure 3 that the relay C is operated by the negative square pulses from the trigger circuit 41 after these have been passed through a rectifying and differentiating circuit 95 and a relay-operating circuit 96. These circuits are shown in Figure 6. The negative square pulses are applied through a capacitor 97 to a point 98 which is connected through a rectifier 103 to a bias terminal 99. The point 98 is connected through a resistor 100 to the grid of a triode 101, the grid being also connected through a resistor 102 to the bias terminal 99. As soon as the leading edge of the negative square pulse exceeds a small negative value, the rectifier 103 conducts and by-passes the remainder of the pulse, and the point 98 then remains at a constant potential for the remainder of the duration of the negative square pulse. At the end of the pulse, the potential of the point 98 increases sharply, the rectifier 103 becomes non-conducting, and the rise in potential at the grid of the triode 101 causes the relay C in the anode circuit of the triode to be operated, after a short interval $x$ (Figure 6) the length of which is determined by the operating time of the relay. The condenser 97 then discharges exponentially and after a further interval $y$, when the potential at point 98 has decreased to a given value, the relay C is de-energised. Thus this relay is energised a short time after the end of an "error time" pulse and is de-energized again after a fixed interval and before the next "error time" pulse arrives. This is as required for the closing and re-opening of the contacts C1 and C2. At the end of an "error time" pulse, the integrating capacitor 78 is charged to a voltage representing the product of the error time and the square of the press speed. The relay C then operates, and contact C1 closes to apply this voltage signal to capacitor 81. At the same time, capacitor 82 charges through contact C2. Relay C is then de-energised, contact C1 opens and contact C2 changes over to discharge capacitor 78 in readiness for the next charging pulse.

The positive square pulses from the trigger circuit 41 are also applied through a differentiating and rectifying circuit 104 (Figure 3) to a trigger circuit 105 which operates a relay D (see D/3 in Figure 7) controlling the pasting operation. These circuits are shown in detail in Figure 7. The positive square wave (diagram (a), Figure 7) is passed through a differentiating circuit comprising a capacitor 106 and a resistor 107 having values such that the wave form is distorted in the manner shown in diagram (b) of Figure 7. The negative part of this wave is by-passed by a rectifier 108 and a waveform of the shape shown in diagram (c) (in which the amplitude of the trailing edge has been reduced as a function of the length of the pulse) is applied to a further differentiating circuit consisting of capacitor 109 and resistor 110. The effect of this differentiating circuit is to produce a sharp positive pulse (diagram (d), Figure 7) corresponding to the leading edge of the positive square pulse and a sharp negative pulse of smaller amplitude corresponding to the trailing edge of the pulse. The positive pulses are removed by a rectifier 111 and the remaining negative pulses, the amplitude of which varies as an inverse function of the length of the "error time" pulses, are applied to the trigger circuit 105. These negative pulses are applied to the grid of a triode 112 which, with a triode 113, forms the trigger circuit 105 (Figure 3). The trigger circuit 105 operates in a manner similar to that which has been described in connection with trigger circuit 41. Triode 112 is normally conducting, but the arrival of a negative pulse of sufficiently large amplitude reverses the conducting condition of the triodes for a fixed period of time, after which the trigger circuit resets itself. While the error pulses are of long duration, the negative pulses which reach the grid of triode 112 are too small to reverse the condition of the trigger circuit. When the error has been reduced to a sufficiently small value, and the error pulse is of short duration, the amplitude of the next negative pulse will be sufficiently large to operate the trigger circuit, as a result of which the relay D in the anode circuit of the triode 113 is energised to initiate the operation of the "pasting" and cutting mechanism. After a short interval, the trigger circuit 105 resets itself and relay D is de-energised.

As stated above, when the motor 23 is not being used to bring the preprinted units on a new reel into register with those on the web which is being unwound from an old reel, it can be used to adjust the tension of the web. The tension control circuit is illustrated diagrammatically in Figure 3. The tension resolver 36 (see also Figure 1) is supplied with an alternating potential of steady amplitude and provides an alternating output signal, the amplitude of which varies with the angular position of the levers 33. This signal alone is insufficient to be used as the tension control, since the press speed must also be taken into account. The reason for this will be clear when it is considered that if the speed of the motor 10 changes, the speed of the draw rollers and of the main drive to the belt 12 will change proportionately, and the correction velocity which the motor 23 has to put in to bring the speed up to that of the draw rollers will change. The signal from the tension resolver is therefore applied to a variable-mu amplifier 115 which also receives a signal from the D.C. tachogenerator 59, which is driven in accordance with the press speed. The gain of the amplifier 115 is therefore controlled as a function of the press speed, and the output of the amplifier, representing approximately the product of the error in tension and the press speed, is applied through a rectifier circuit 116, a contact A2 and a storage capacitor 117, to the cathode follower stage 62, the contact A2 being closed when the motor 23 is being used to control tension. During tension control, a contact B2 (Figure 5) is also closed, connecting the grid of the triode 80 in the cathode follower stage 61 to a point of fixed potential, so that the cathode of the triode 80 also has a constant potential.

Figure 8:
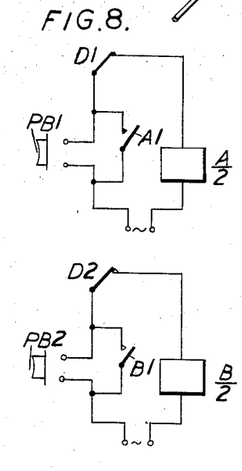
Figures 8 and 9 are wiring diagrams showing the connections of the remaining relays.
Figure 9:
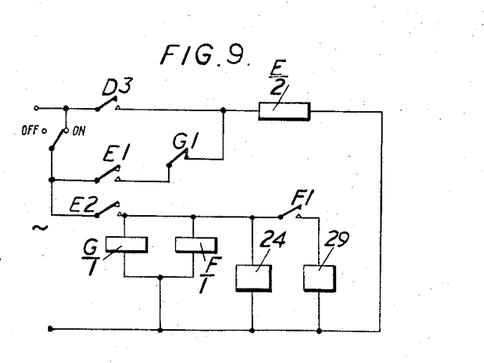
Figure 10:
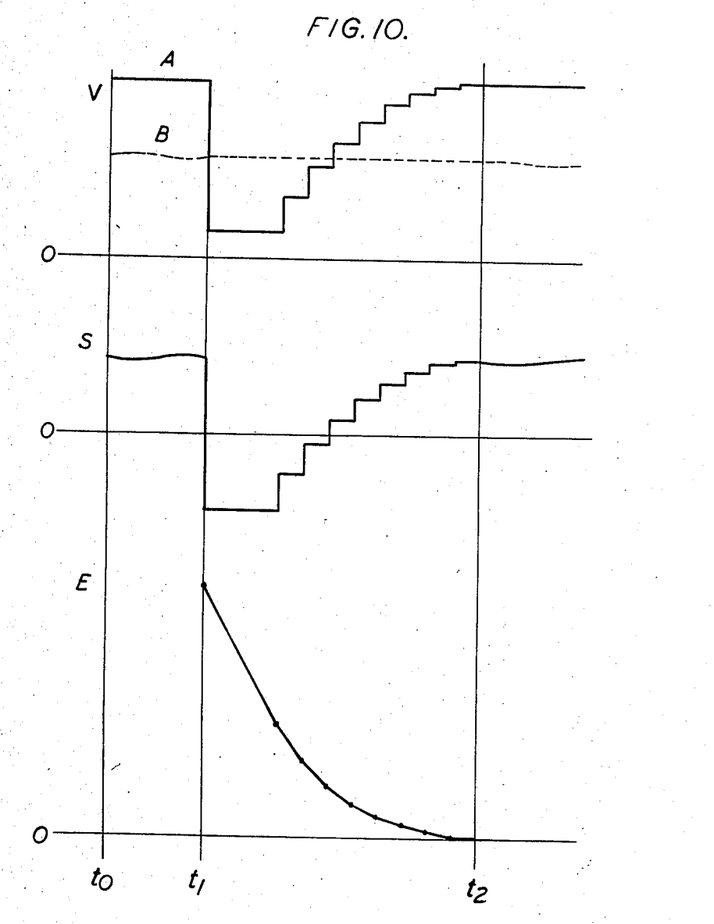
Figure 10 is a graphic representation illustrating the operation of the apparatus.

The operation of the apparatus is as follows:

Figure 10 shows diagrammatically the voltage V of the cathodes of the triodes 80 and 87 (Figure 5) during a change from tension control to register control and back to tension control, the speed S of the motor 23 during the same period, and the amplitude E of the register error during register control. In normal operation, when the web is being drawn from the reel in the uppermost position and the motor 23 is being used as a tension controller, the speed of the motor 23 will not vary very much over a short period of time. The voltages A and B at the cathodes of the triodes 80 and 87 respectively, and the speed of the motor 23 during a period of tension control are represented by the portion of the diagrams between $t_0$ and $t_1$ in Figure 10. The potential A is held fixed by the closing of the contact B2 and the potential B has a value representing the tension error. The speed of the motor 23 is therefore as shown in the middle diagram. When the arms of the reelstand are rotated to bring a fresh reel into the uppermost position, and the system is to be changed over to register error control, a push button PB1 (Figure 8) is pressed and a relay A (see A/2 in Figure 8) is energised through the closed contact D1. Contact A1 closes to complete a holding circuit for relay A and contact A2 disconnects the tension resolver 36 and the amplifying and rectifying stages 115 and 116 from the storage capacitor 117. While the register error is being corrected and the tension resolver is disconnected, the voltage which is applied to the grid of triode 87 (Figure 5) is maintained at a substantially constant value by the storage capacitor 117 (Figure 3), so that the voltage B at the cathode of the triode 87 remains substantially at the value prevailing when contact A2 is opened. With the new reel in its correct position relative to the old web, a push button PB2 (Figure 8) is pressed and relay B (see B/2 in Figure 8) is energised. Contact B1 closes to complete a holding circuit for relay B, while contact B2 (Figure 5) disconnects the grid of triode 80 from the fixed potential so that the latter triode can respond to the error correction signals. The period of register error control is represented in Figure 10 by the portion of the diagrams between $t_1$ and $t_2$.

As mentioned above, relay C operates just after each "error time" pulse to transfer the charge of the integrating capacitor 78 through contact C1 to the input circuit of the cathode follower 61, and is de-energized after a fixed interval, whereupon the integrating capacitor is discharged.

When contact C1 closes, the error correction signal is applied to the storage capacitor 81, which maintains the grid of triode 80 at the "error correction" potential after C1 has reopened and throughout the cycle, until C1 again closes to charge the storage capacitor 81 to a value representing the new error correction signal. If the error is initially very large, the integrating capacitor 78 will "saturate" at its lower reference potential before the end of the "error time" pulse, and the error correction signal at the capacitor 81 will have the same value for a number of cycles. When the error correction signal is first applied to the grid of triode 80, the cathode potential A (Figure 10) of this valve will decrease sharply below the cathode potential B of triode 87, and the motor 23 will reverse and will start to run at a maximum speed in the opposite direction to that in which it rotated during tension control. The motor 23 will continue to run at this speed, reducing the register error steadily until the "error time" pulse has shortened to such an extent that it reaches a first predetermined value, at which the integrating capacitor 78 ceases to "saturate." The error correction signals which are applied to the grid of triode 80 now decrease steadily, cycle by cycle, and the cathode potential A of the triode rises in a corresponding manner. The speed of the motor 23 is steadily reduced and is then reversed, so that the rotation is thereafter in the same direction as for tension control, and the speed of the motor now increases.

When the register error is reduced to a second predetermined value, and the "pasting" mechanism is operated, the speed of the motor has been increased substantially to its value during tension control, just prior to the operation of the push button PB1. The fixed potential at which the grid of triode 80 is held during tension control is made equal to the potential corresponding to zero error, so that when the system reverts to tension control, the motor will be running at substantially the correct speed for maintaining the required tension, and there will be no sudden pull on the joint.

The pasting mechanism is controlled by relay D, which, as has been described above, operates when the value of the register error is sufficiently small. Contact D3 closes to energise a brush relay E, after which contact E1 closes to complete a holding circuit for relay E and contact E2 closes to energise the brush coil 24. A delayed relay F is also energised after a short interval, and after a longer interval, a delayed relay G is operated. With the energisation of the brush coil 24, the brush is moved forwardly to press the web into contact with the rotating reel, so that these two will stick together next time the adhesive portion of the rotating reel comes opposite the brush. At the same time relay D is de-energised so that contacts D1 and D2 open, resulting in the de-energisation of relays A and B, and the closing of contacts A2 and B2, so that the system reverts to tension control. With the energisation of relay F, contact F1 closes and the knife coil 29 is energised, the knife then moving forward to cut the web from the old reel after which only the web from the new reel is fed through the rollers. When relay G is energised, contact G1 is opened and relay E is de-energised, followed by the de-energisation of the knife and brush coils and the relays F and G.

It will be clear that the impulses representing the passage of preprinted units on the web and the reel can be produced by methods other than photo-electric scanning. As examples, the impulses which correspond to the rotation of the new reel may be produced either by a magnetic switch or by an optical system controlled by revolution of the new reel. The magnetic switch may take a variety of forms but in essence all that is required is that at a particular point in the revolution of the new reel, an electrical impulse should be produced. If the impulse is to be produced optically, the shaft of the reel may, for example, carry a small mirror which at the predetermined instant reflects a beam of light into a photo-cell to produce the necessary impulse.

The impulse related to the old web may also be produced by means other than photo-electric scanning. In general the web will be fed either to a printing press or to a folding apparatus or some other form of apparatus dependent on the correct register of the printed matter. Consequently this other apparatus will be synchronised with the printed matter and thus may itself be used to provide the impulse, for example, by way of a magnetic switch or an optical arrangement as just described.

In the apparatus which has been described, the new reel is driven up to speed by means of a belt drive applied to its periphery. As an alternative, the new reel may be run up from standstill by means of a direct drive from a variable speed motor, applied to the spindle of the reel. In this case the register control mechanism is applied to control the speed of the motor so as to cause the speed of the new reel to approximate to that of the old web, while at the same time bringing the two into register with one another. Thus instead of controlling an epicyclic gearbox as described in the previous example, the register control mechanism acts directly on the variable speed motor.

Although the new reel is preferably wound so that its periphery includes an integral number of preprinted units, it is found in practice that the apparatus will work satisfactorily even if the periphery is not exactly equal to an integral number of preprinted units. If this is the case, a register error is introduced once per revolution. If the linear speeds of the new reel and the old web are equal, this error which is introduced is cumulative, and without the need for any speed control of the reel, the two webs will periodically come into register and then go out of register again over the course of a number of revolutions. However, it is difficult to control the pasting operation to take place at the exact instant when the two webs are passing through the condition of exact register, and in practice it is found that, when the periphery of the new reel is not exactly equal to an integral number of preprinted units, a small difference in the speeds of the two webs is an advantage rather than otherwise. When there is an appropriate small difference of speed, the register error, which is constantly introduced at a particular point in the revolution, is then gradually removed again during the remainder of the revolution. Consequently the effect is of a sequence of abruptly introduced and gradually cancelled register errors. Thus a graph of register error plotted against time has a saw-tooth configuration, which may be adjusted to lie on either side of the zero line so that the register fluctuates on either side of the correct value. Under these conditions, and provided the small difference of speed is maintained, the instant at which the pasting operation is effected is not critical and the only difficulty which arises is in reducing the sudden pull which is applied to the webs when the paste takes place. This sudden pull may partly be taken up by a yielding tension roller, but in addition it is compensated for to a large extent by the tension control applied to the electric motor driving the epicyclic gearbox. As previously mentioned, the tension control which is inoperative during the pasting operation is restored immediately after the past is complete and immediately takes effect to counteract the effects of unequal velocities of the two webs.

We claim:

1. Apparatus for automatically sticking a moving first web of preprinted paper to a second web of preprinted paper on a rotating reel at an instant such that preprinted units on the two webs are substantially in register with one another, the two webs carrying register indications and the second web on the rotating reel having its periphery approximately equal to an integral number of preprinted units, the apparatus comprising two devices sensitive to the passage of the said register indications to provide electric signals corresponding to the passage of integral numbers of preprinted units on the two webs, respectively, pulse-generating means responsive to signals from the said devices to generate a pulse the length of which represents the interval between the passage of the marks on the first and second webs, correction means for modifying the speed of the reel in accordance with the length of the said pulses in such a manner as to reduce the said length, and pulse-responsive means responsive to a predetermined minimum length of said pulses to operate a device for sticking the said moving web to the said further web on the rotating reel.

2. Apparatus according to claim 1, wherein said correction means comprises a variable speed electric motor operative to adjust the speed of the reel in response to the said pulses, the speed of the reel being modified in accordance with the product of the pulse length and the square of the press speed.

3. Apparatus for automatically sticking a moving first web of preprinted paper to a second web of preprinted paper on a rotating reel at an instant such that preprinted units on the first and second webs are substantially in register with one another, comprising two light-sensitive devices for scanning marks on the first and second webs respectively, pulse-generating means responsive to signals from the light-sensitive devices to generate a pulse the length of which represents the interval between two signals representing marks on the first and second webs respectively, correction means for modifying the speed of the reel in accordance with the length of the said pulses in such a manner as to reduce the said length, and means responsive to a predetermined minimum length of said pulses to operate a device for sticking the said moving web to the said further web on the rotating reel.

4. Apparatus according to claim 3 in which said correcting means includes an electric motor for adjusting the speed of said rotating reel on which said second web is wound to reduce said register error, tension-measuring means for producing a voltage which varies with the tension of said first web, and means for applying the tension voltage to said electric motor until just prior to pasting said first and second webs together, whereby the tension in said first web is maintained substantially constant.

5. Apparatus according to claim 4, in which, when a register error has been reduced to a value such that the old web can be stuck to the new reel, the speed and direction of the correction motor are the same as they were when the correction motor was operating as a tension control, just prior to its operation as a register control.

6. Apparatus according to claim 5, in which the tension correction voltage and the register correction voltage are applied to the respective control grids of two valves, the difference between the output voltage levels of the two valves being used to control the correction motor.

7. Apparatus according to claim 6, including a switch contact by means of which a voltage-generating device associated with the tension roller is disconnected during register correction, and a storage capacitor by means of which the voltage which is applied to the control grid of the tension correction valve is maintained, during register correction, at its level just prior to the operation of the switch contact.

8. Apparatus according to claim 6, including a switch contact by means of which a steady voltage is maintained at the grid of the register control valve when the correction motor is operating as a tension control, this steady voltage being equal to that corresponding to zero register error during register correction.

9. Apparatus according to claim 3, in which the means for operating the sticking device includes a capacitor to which the pulse from the pulse generating means is applied and which discharges throughout the length of the pulse, and including means for rectifying and differentiating the output of the capacitor to provide a sharp pulse corresponding to the trailing edge of the input waveform and having an amplitude which increases as the length of the input pulse decreases.

10. Apparatus for automatically sticking a moving first web of preprinted paper to a second web of preprinted paper on a rotating reel at an instant such that preprinted units on the first and second webs are substantially in register with one another, comprising two light-sensitive devices for scanning marks on the first and second webs respectively, pulse-generating means responsive to signals from the light-sensitive devices to generate a pulse the length of which represents the interval between two signals representing marks on the first and second webs respectively, a correction motor for modifying the speed of the reel, means including a switching device operative to apply a signal the amplitude of which varies in accordance with the length of said pulse to the operating circuit of said motor, means for operating said switching device after each of said pulses, said correction motor serving to modify the speed of the reel in such a manner as to reduce the length of said pulses, and means responsive to the said pulses to operate a device for sticking the said moving web to the said further web on the rotating reel when the register error represented by the pulse length reaches a predetermined small value.

11. Apparatus according to claim 10, including an integrating capacitor which is charged to a voltage which varies with the length of the pulse.

12. Apparatus according to claim 11, including a circuit by means of which the integrating capacitor is charged for the duration of the said pulse with a current which is controlled by the speed of the press.

13. Apparatus according to claim 12, and including means for varying the charging current in accordance with the square of the speed of the press.

14. Apparatus according to claim 10, in which the signal is applied through the said switching device to a storage capacitor by means of which the speed of the correction motor is maintained substantially constant until the next signal is received.

15. Apparatus according to claim 14, including a further switching device which operates after the application of the signal to the storage capacitor and through which the integrating capacitor is discharged.

16. Apparatus according to claim 15, in which the two switching devices are contacts of a relay arranged to operate in response to the trailing edge of the said pulse and to be returned to its normal condition after a fixed time interval.

17. Apparatus for automatically sticking a moving first web of preprinted paper to a second web of preprinted paper on a rotating reel at an instant such that preprinted units on the first and second webs are substantially in register with one another, comprising two light-sensitive devices for scanning marks on the first and second webs respectively, pulse-generating means responsive to signals from the light-sensitive devices to generate a pulse the length of which represents the interval between two signals representing marks on the first and second webs respectively, correction means including an electric correction motor for modifying the speed of the reel in accordance with the length of said pulses in such a manner as to reduce said length, means responsive to the said pulses to operate a device for sticking the said moving web to the said further web on the rotating reel when the register error represented by the pulse length reaches a predetermined small value, tension measuring means including a tension roller for producing a voltage which varies with the tension of said first web, and means for applying said tension voltage to said electric motor until just prior to pasting said first and second webs together, whereby the tension in said first web is maintained substantially constant.

18. In a rotary printing press, apparatus for automatically sticking a moving first web of preprinted paper to a second web of preprinted paper on a rotating reel at an instant such that preprinted units on the first and second webs are substantially in register with one another, comprising two light-sensitive devices for scanning marks on the first and second webs respectively, pulse-generating means responsive to signals from the light-sensitive devices to generate a pulse the length of which represents the interval between two signals representing marks on the first and second webs respectively, correction means including an electric correction motor for modifying the speed of the reel in accordance with the length of the said pulses in such a manner as to reduce the said length, means responsive to the said pulses to operate a device for sticking the said moving web to the said further web on the rotating reel when the register error represented by the pulse length reaches a predetermined small value, tension measuring means for producing a voltage which varies with the tension of said first web, a tension control circuit comprising a variable-mu amplifier to which there are applied an alternating signal, the amplitude of which represents the error in tension, and a D.C. signal representing the speed of the press, and means for applying the output of said variable-mu amplifier to said electric motor until just prior to pasting said first and second webs together, whereby the tension in said first web is maintained substantially constant.

References Cited in the file of this patent

UNITED STATES PATENTS

| | | |
|---|---|---|
| 2,212,812 | Horton | Aug. 27, 1940 |
| 2,536,153 | Bishop | Jan. 2, 1951 |
| 2,621,865 | Wieking | Dec. 16, 1952 |